United States Patent [19]

Sugawara et al.

[11] Patent Number: 5,155,745
[45] Date of Patent: Oct. 13, 1992

[54] SYNCHRONIZER FOR ASYNCHRONOUS COMPUTER COMMAND DATA

[75] Inventors: Akihiko Sugawara; Yutaka Gotou, both of Tokyo, Japan

[73] Assignee: NEC Corporation, Tokyo, Japan

[21] Appl. No.: 596,305

[22] Filed: Oct. 12, 1990

[30] Foreign Application Priority Data

Oct. 12, 1989 [JP] Japan .................................. 1-267648

[51] Int. Cl.⁵ .......................... H04L 7/04; H03K 5/135
[52] U.S. Cl. ..................................... 375/110; 375/106; 307/269; 328/151
[58] Field of Search ........................... 375/4, 106, 110; 307/269; 328/151

[56] References Cited

U.S. PATENT DOCUMENTS

| 4,851,710 | 7/1989 | Grivna | 307/269 |
| 4,935,942 | 6/1990 | Hwang et al. | 375/106 |
| 5,036,221 | 7/1991 | Brucculeri et al. | 307/269 |

Primary Examiner—Benedict V. Safourek
Assistant Examiner—Young Tse
Attorney, Agent, or Firm—Foley & Lardner

[57] ABSTRACT

Asynchronous command data are converted to synchronous data by a synchronizer comprising a toggle flip-flop which receives the asynchronous command data to produce a pair of true and complementary outputs in response to a transition of the command data. A first NOR gate is responsive to the command pulses and the true output of the toggle flip-flop to produce a train of first pulses, and a second NOR gate is responsive to the command pulses and the complementary output of toggle flip-flop to produce a train of second pulses. First and second sampling flip-flops are connected to the outputs of the first and second NOR gates, respectively, to sample the first and second pulses therefrom in response to a trailing edge transition of a clock signal with a frequency twice as high as the nominal maximum frequency of the command pulses. The output signals of the first and second sampling flip-flops are sampled in response to a leading edge transition of the clock signal and the sampled output signals are combined to produce a train of output pulses having transitions coinciding with transitions of the clock signal.

5 Claims, 3 Drawing Sheets

SYNCHRONIZER FOR ASYNCHRONOUS COMPUTER COMMAND DATA

BACKGROUND OF THE INVENTION

The present invention relates generally to synchronizers, and more specifically to a synchronizer particularly suitable for command signals of computers.

With a synchronizer implemented with at least one D-type flip-flop, the application of an asynchronous data will cause the flip-flop to assume what is called a "metastable" state if the transition point of the data coincides with the transition point of the sampling pulse with a frequency at least twice as higher than the maximum frequency of the asynchronous data (Nyquist criterion). If this type of synchronizer is employed in computers for synchronizing asynchronous command pulses propagating through an asynchronous bus system with the clock timing of a synchronous bus system, the sampling frequency of the clock timing must be sufficiently high so that the pulse of the least possible duration of the asynchronous command signal may be sampled. Since the period of the inactive state of the asynchronous command signal cannot be stretched while the period of the active state can be altered using a known wait control technique, the sampling frequency must be chosen so that the inactive state of least duration may be sampled. However, the asynchronous command signal may contain pulses of very short duration due to the introduction of newly developed high-speed circuitry to the asynchronous system and may escape the sampling points of the synchronous system if the clock frequency of the latter remains unchanged, resulting in the violation of the Nyquist criterion.

SUMMARY OF THE INVENTION

It is therefore an object of the present invention to provide a synchronizer which is capable of sampling an asynchronous signal having a fixed length of inactive state even though it contains higher frequency components which may violate the Nyquist criterion.

This object is obtained by decomposing constituent pulse components of the asynchronous signal to produce odd-and even-numbered pulses of longer duration than those of the asynchronous signal and sampling the odd- and even-numbered pulses first at a trailing edge transition of a clock signal and then at a leading edge transition of the clock signal.

According to the present invention, there is provided a synchronizer which comprises a toggle flip-flop for receiving asynchronous input data pulses and changing state of the flip-flop in response to a transition point of the received data pulses to produce a pair of true and complementary outputs. A NOR gate circuit is provided for receiving the asynchronous input pulses and the true and complementary outputs of the toggle flip-flop to produce a first train of pulses and a second train of pulses which alternate with those of the first train. First and second sampling flip-flops are responsive to the first and second trains of pulses, respectively, to sample the pulses of the first and second trains in response to the trailing edge transition of a clock pulse with a frequency twice as higher than nominal maximum frequency of the asynchronous input data pulses. Means are provided for sampling the output signals of the first and second sampling flip-flops in response to the leading edge transition of the clock pulse and combining the sampled output signals to produce a train of output pulses having transitions coinciding with transitions of the clock pulses.

BRIEF DESCRIPTION OF THE DRAWINGS

The present invention will be described in further detail with reference to the accompanying drawings, in which.

DETAILED DESCRIPTION

Figure 1:
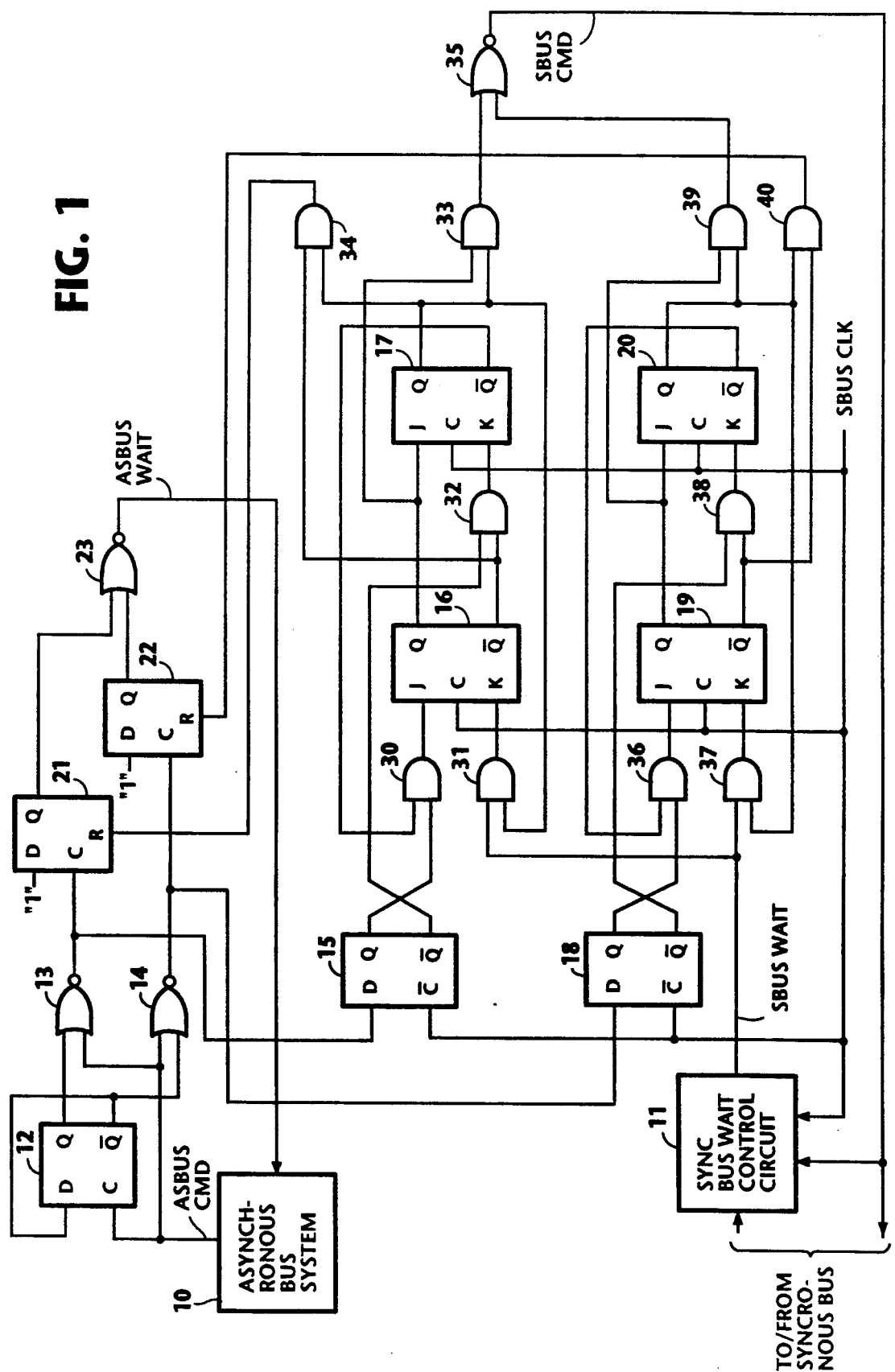
FIG. 1 is a block diagram of a synchronizer according to the present invention.

The synchronizer of the present invention, as represented in FIG. 1, is shown incorporated as an interface between an asynchronous bus system and a synchronous bus system. The synchronizer comprises a D-type flip-flop 12 having a clock input to which an asynchronous command pulse signal is supplied from an asynchronous bus system 10. The data input of flip-flop 12 is connected to its complementary output so that it operates in a toggle fashion by changing the binary state of its outputs in response to the leading edge of the asynchronous command pulses. The Q and $\bar{Q}$ outputs of flip-flop 12 are coupled respectively to NOR gates 13 and 14 to both of which the asynchronous command signal is also applied. These NOR gates cooperate with the toggle flip-flop 12 to operate as a separator for alternately separating the constituent pulses of the asynchronous command signal into odd- and even-numbered components at the outputs of NOR gates 13 and 14, respectively. The outputs of NOR gates 13 and 14 are respectively coupled to the data input of D-type flip-flops 15 and 18, each having a negative clock input to which the clock pulse of the synchronous bus system is applied, so that the odd- and even-numbered components of the asynchronous command signal are sampled by an odd flip-flop 15 and an even flip-flop 18 at the trailing edge of the clock pulse. The frequency of the clock pulse is twice as high as the nominal maximum frequency of the asynchronous command signal.

The outputs of odd and even flip-flops 15 and 18 are coupled to a sample-and-combine circuit which samples the outputs of these flip-flops at the leading edge of the clock pulse and combines the sampled signals to produce a synchronous command signal. The sample-and-combine circuit includes a first set of J-K flip-flops 16 and 17 associated with the odd flip-flop 15 and a second set of J-K flip-flops 19 and 20 associated with the even flip-flop 18. The Q output of flip-flop 15 is coupled to an AND gate 30 to which the $\bar{Q}$ output of flip-flop 17 is also applied, the output of AND gate 30 being connected to the J input of flip-flop 16. The $\bar{Q}$ output of flip-flop 15 is coupled to an AND gate 32 to which the Q output of flip-flop 16 is also connected, the output of AND gate 32 being connected to the K input of flip-flop 17. A synchronous-bus wait control circuit 11 of known design is provided, which supplies a wait control pulse to AND gate 31 whose output is connected to the K input of flip-flop 16. The Q output of flip-flop 16 and the J input of flip-flop 17 are connected together to AND gate 33 to which the Q output of flip-flop 17 is also applied. The Q and $\bar{Q}$ outputs of flip-flop 17 are connected to AND gates 31 and 30, respectively, while the Q output of this flip-flop is further coupled to an AND gate 34 to which the $\bar{Q}$ output of flip-flop 16 is connected. Flip-flops 16 and 17 are supplied with the clock pulse to trigger events at the leading edge of the clock input.

In a similar manner, the Q output of the even flip-flop 18 is coupled to AND gate 36 to which the $\overline{Q}$ output of flip-flop 20 is also applied, the output of AND gate 36 being connected to the J input of flip-flop 19. The $\overline{Q}$ output of flip-flop 18 is coupled to AND gate 38 to which the $\overline{Q}$ output of flip-flop 19 is also connected, the output of AND gate 38 being connected to the K input of flip-flop 20. The wait control pulse is also applied to AND gate 37 whose output is connected to the K input of flip-flop 19. The Q output of flip-flop 19 and the J input of flip-flop 20 are connected together to AND gate 39 to which the Q output of flip-flop 20 is also applied. The Q and $\overline{Q}$ outputs of flip-flop 20 are connected to AND gates 37 and 36, respectively, while the Q output of this flip-flop is further coupled to an AND gate 40 to which the $\overline{Q}$ output of flip-flop 19 is connected. Flip-flops 19 and 20 are supplied with the clock pulse to trigger events at the leading edge of the clock pulse. The outputs of AND gates 33 and 39 are combined in an NOR gate 35 whose output is connected to wait control circuit 11 and further to the synchronous bus system, not shown.

The outputs of NOR gates 13 and 14 are further connected to the clock input of flip-flops 21 and 22, respectively, to produce outputs for coupling to a NOR gate 23 whose output is in turn coupled to the asynchronous bus system 10. The outputs of AND gates 34 and 40 are supplied respectively to the reset inputs of flip-flops 21 and 22.

The operation of the circuit of FIG. 1 will be given below with reference to timing diagrams shown in FIGS. 2A and 2B. Note that in FIG. 2B some of the waveforms of FIG. 2A are repeated for convenience.

The asynchronous command signal from circuit 10 is assumed to be active when the command signal is in a low binary state and inactive when it is in a high binary state. Initially, the Q and $\overline{Q}$ outputs of toggle flip-flop 12 are low and high voltage levels, respectively, and the outputs of NOR gates 13 and 14 are at low voltage state. Assume that the $\overline{Q}$ outputs of all flip-flops are initially at high voltage level, and the synchronous-bus wait request signal is at high voltage level. Therefore, AND gates 33 and 39 initially produce low-level outputs, causing NOR gate 35 to switch to a high voltage level.

Figure 2A:
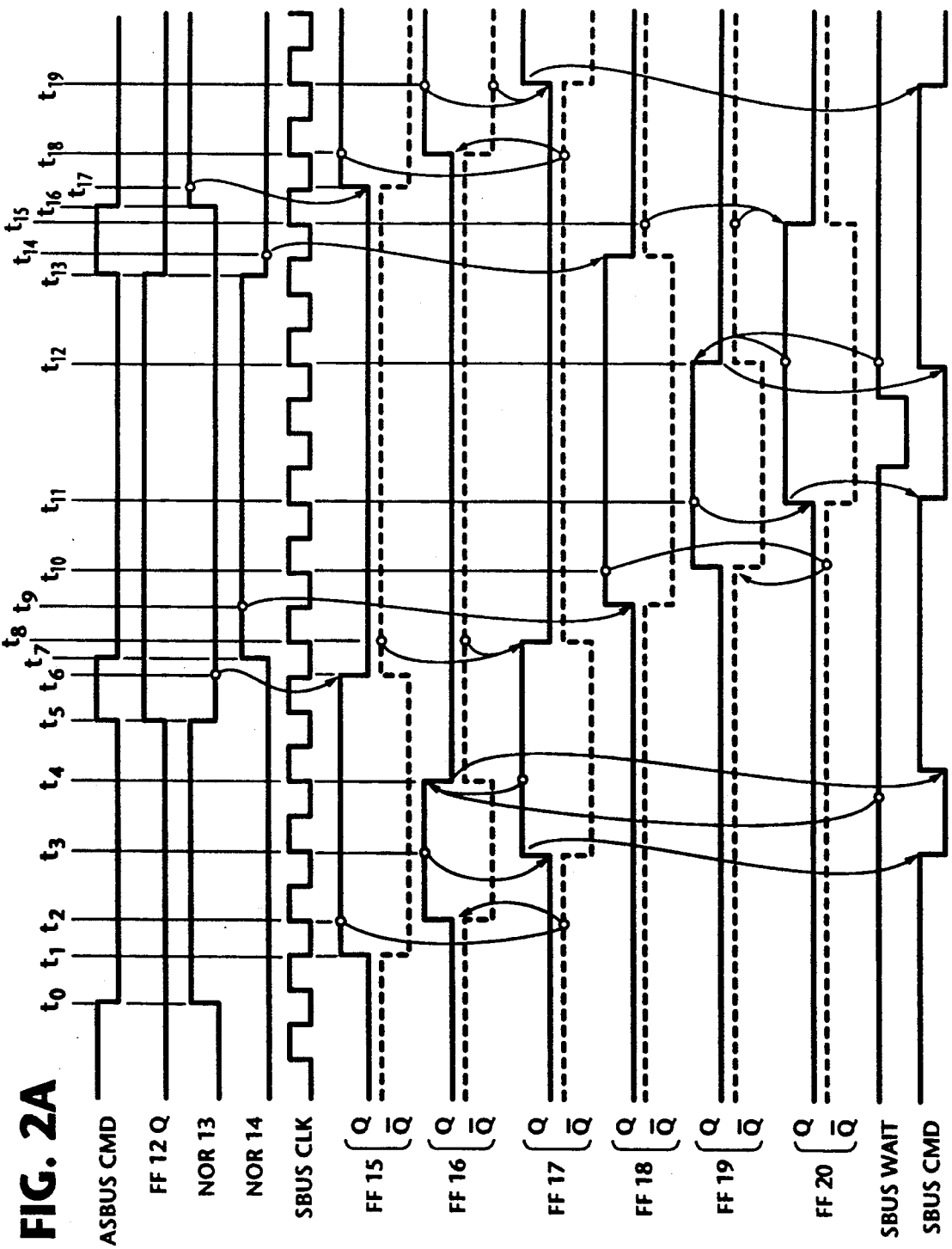
FIGS. 2A and 2B are timing diagrams for describing the operation of the synchronizer of this invention.

Referring first to FIG. 2A, the command signal switches from high to low binary state at time $t_0$, entering an active state. Since the clock input of toggle flip-flop 12 is responsive only to the leading edge of the input command signal, its output states remain unchanged and NOR gate 13 switches from low to high voltage level, producing an "odd-numbered" pulse. Flip-flop 15 is thus triggered in response to a trailing edge of the synchronous-bus clock at time $t_1$, switching its Q output to high level. This allows AND gate 30 to produce a high-level output, causing J-K flip-flop 16 to change state at time $t_2$ in response to a leading edge of the synchronous-bus clock, resulting in the application of a high-level input to the J input of J-K flip-flop 17. The latter is now conditioned to change state at time $t_3$ in response to a leading edge of the clock, activating AND gate 33 to produce a high-level output that causes NOR gate 35 to switch to a low-output state, resulting in a low-level synchronous command pulse which is applied to synchronous bus wait control circuit 11. With the Q output of flip-flop 17 being switched to high level at time $t_3$, AND gate 31 is activated to precondition flip-flop 16 to change state in response to the next leading edge transition of the clock that occurs at time $t_4$, switching the Q output of flip-flop 16 to low level. This causes AND gate 33 to supply a low-level output to NOR gate 35 so that the output of the latter goes high, resulting in a high-level synchronous command pulse.

At time $t_5$, the asynchronous command signal rises to high level (inactive state), causing the toggle flip-flop 12 to switch to high output state. NOR gate 13 thus switches to low-output state. The odd flip-flop 15 changes state in response to a trailing edge of the clock at time $t_6$, preconditioning flip-flop 17 to change state in response to the next leading edge of the clock which will occur at time $t_8$. At time $t_7$, the command signal goes low (active state) and NOR 14 is switched to high output state and subsequently at time $t_8$, flip-flop 17 changes state. With the output of NOR gate 14 being at high level, flip-flop 18 changes state in response to a trailing edge of the clock at time $t_9$, preconditioning flip-flop 19 to change state in response to the next leading edge of the clock which appears at time $t_{10}$. Therefore, the Q output of flip-flop 20 switches to high voltage level at time $t_{11}$, causing AND gate 39 to apply a high-level output to NOR gate 35, resulting in a low voltage at the output of this NOR gate. The bus wait control circuit 11 may respond to the falling edge of the sync-bus command signal by switching the sync-bus wait request signal (SBUS WAIT) to low level and then to high level following one clock interval. At time $t_{12}$, AND gate 37 is conditioned to produce a high-level output which triggers flip-flop 19 into a low Q-output state, causing AND gate 39 to supply a low-level output to NOR gate 35 to switch it into a high voltage state.

At time $t_{13}$, the asynchronous command signal now rises to high level (inactive state), switching flip-flop 12 to a low Q-output state and NOR gate 14 to a low output state, preconditioning flip-flop 18 to change state in response to the next trailing edge of the clock timing which occurs at time $t_{14}$, whereupon high voltages appear at the $\overline{Q}$ outputs of flip-flops 18 and 19, causing AND gate 38 to apply a high-level output to the K input of flip-flop 20, conditioning it to change state at time $t_{15}$.

At time $t_{16}$, the asynchronous command signal drops to low level (active state), causing NOR gate 13 to produce a high level output again, conditioning flip-flop 15 to change state at time $t_{17}$. As a result, high voltages appear simultaneously at the Q output of flip-flop 15 and the $\overline{Q}$ output of flip-flop 17, causing AND gate 30 to apply a high-level output to flip-flop 16, which changes state in response to the next leading edge transition of the clock which occurs at time $t_{18}$. Finally, a high voltage at the Q output of flip-flop 16 causes flip-flop 17 to change state in response to the leading edge transition that occurs at time $t_{19}$, so that a low-level $\overline{Q}$ output of flip-flop 17 causes AND gate 33 to apply a low-level output to NOR gate 35, resulting in a low-level sync-bus command pulse.

It is seen from the foregoing operation that the asynchronous command signal is converted to a synchronous command signal which is synchronized with the leading edge transitions of the clock pulses of the synchronous bus system. Since the asynchronous command signal is alternately decomposed into odd- and even-numbered pulse components, the probability of command pulse components missing sampling instants is reduced to a considerably low value.

Figure 2B:
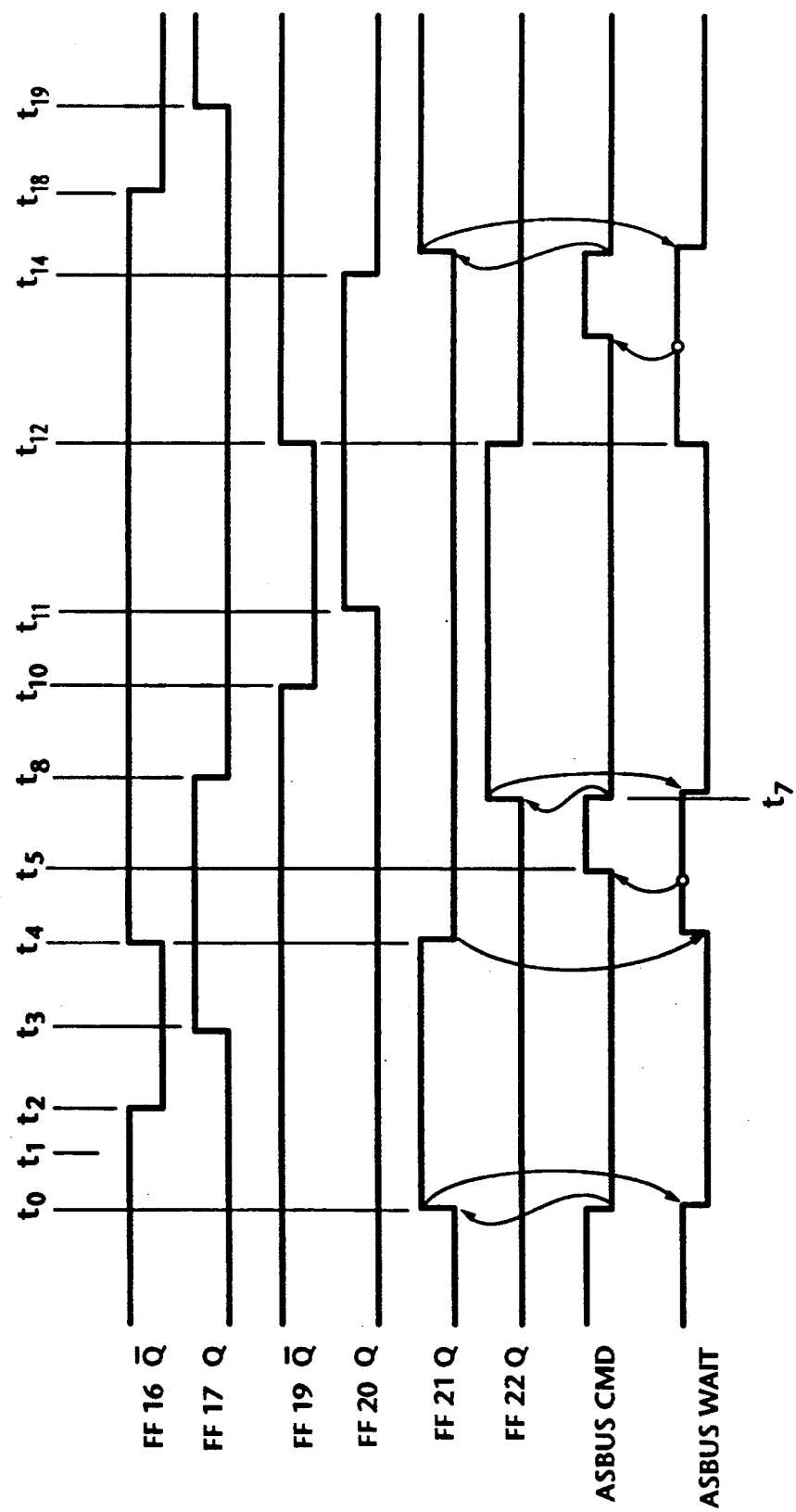

Referring next to FIG. 2B, flip-flops 21 and 22 are initially at low output state, producing a high-level output at the output of NOR gate 23 which is applied to the asynchronous bus system 10. At time $t_0$, flip-flop 21 switches to a high-output state in response to the falling edge of asynchronous command signal, resulting in the application of a low-level output from NOR gate 23 to asynchronous bus system 10. At time $t_4$, high voltages appear simultaneously at the $\overline{Q}$ output of flip-flop 16 and at the Q output of flip-flop 17, enabling AND gate 34 to apply a high-level output to the reset input of flip-flop 21, thus switching it to low level. Low-level voltages thus appear simultaneously at the inputs of NOR gate 23, switching the asynchronous wait request signal to high level, conditioning the asynchronous command signal to rise to high level at time $t_5$ and subsequently to low level at time $t_7$, whereupon flip-flop 22 switches to a high output state which causes NOR gate 23 to go low. At time $t_{12}$, high voltages appear simultaneously at the $\overline{Q}$ output of flip-flop 19 and at the Q output of flip-flop 20, enabling AND gate 40 to apply a high-level output to the reset input of flip-flop 22, thus switching it to low level. Low-level voltages thus appear simultaneously at the inputs of NOR gate 23, switching the asynchronous wait request signal to high level, conditioning the asynchronous command signal to rise to high level at time $t_{13}$ and subsequently to low level at time $t_{14}$, whereupon flip-flop 22 switches to high output state which causes NOR gate 23 to go low again.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A synchronizer comprising:
   a toggle flip-flop for receiving asynchronous input pulses and changing state of the flip-flop in response to a transition point of said received asynchronous input pulses to produce a pair of true and complementary outputs;
   gate means for receiving said asynchronous input pulses and said true and complementary outputs of said toggle flip-flop to produce a first train of pulses and a second train of pulses which alternate with those of said first train;
   first sampling flip-flop for sampling the pulses of said first train in response to a trailing edge transition of a clock signal with a frequency twice as high as nominal maximum frequency of said asynchronous input pulses;
   second sampling flip-flop for sampling the pulses of said second train in response to the trailing edge transition of said clock signal; and
   means for sampling output signals of said first and second sampling flip-flops in response to a leading edge transition of said clock signal and combining the sampled output signals to produce a train of output pulses having transitions coinciding with the leading edge transitions of said clock signal.

2. A synchronizer as claimed in claim 1, wherein said asynchronous input pulses constitute an asynchronous computer command signal having active and inactive states.

3. A synchronizer as claimed in claim 2, wherein said sampling means comprises:
   a first set of flip-flops connected in series to said first sampling flip-flop, the flip-flops of said first set being responsive to a leading edge transition of said clock signal;
   a first coincidence gate connected to the flip-flops of said first set for producing a first output pulse which occurs during an active state of said asynchronous command signal;
   a second set of flip-flops connected in series to said second sampling flip-flop, the flip-flops of said second set being responsive to the leading edge transition of said clock signal;
   a second coincidence gate connected to the flip-flops of said second set for producing a second output pulse which occurs during an active state of said asynchronous command signal which occurs subsequent to said first output pulse; and
   means for combining the output pulses of said first and second coincidence gates.

4. A synchronizer as claimed in claim 3, further comprising means responsive to the flip-flops of said first and second sets for generating an asynchronous wait request signal and applying said asynchronous wait request signal to a source from which said asynchronous command signal is supplied.

5. A synchronizer as claimed in claim 4, further comprising means for generating a synchronous wait request signal and applying said synchronous wait request signal to the flip-flops of said first and second sets.

* * * * *